United States Patent [19]
Bernstein et al.

[11] 3,713,336
[45] Jan. 30, 1973

[54] COMBINATION FLUID FLOW SPEED AND DIRECTION TRANSDUCER

[76] Inventors: Theodore Bernstein, 5105 Regent Street, Madison, Wis. 53705; Joseph G. Miller, 2113 Tauhee Dr., Madison, Wis. 53711

[22] Filed: Nov. 27, 1970

[21] Appl. No.: 93,371

[52] U.S. Cl. ..................................... 73/189, 33/204
[51] Int. Cl. ............................................. G01w 1/02
[58] Field of Search ............. 73/189; 33/204; 324/47

[56] References Cited

UNITED STATES PATENTS

| | | | |
|---|---|---|---|
| 3,387,491 | 6/1968 | Adams | 73/189 |
| 1,939,690 | 12/1933 | Gunn | 33/204 |
| 1,976,723 | 10/1934 | Gunn | 33/204 |
| 3,420,101 | 1/1969 | Adams | 73/189 |

Primary Examiner—Richard C. Queisser
Assistant Examiner—Arthur E. Korkosz
Attorney—Sughrue, Rothwell, Mion, Zinn & Macpeak

[57] ABSTRACT

A transducer including an anemometer having a magnetic flux concentrator in one arm thereof and including an earth's magnetic field sensitive device for providing a first electric signal which is a measure of both wind direction and the direction of the earth's magnetic field. A permanent magnet fixed to the rotating anemometer energizes once each revolution thereof a reed switch positioned by a wind vane, thereby producing another electric signal which corresponds to the wind direction. Both signals are applied to an indicator which provides a simultaneous indication of wind speed and wind direction relative to the earth's magnetic north pole.

6 Claims, 14 Drawing Figures

PATENTED JAN 30 1973

INVENTORS
THEODORE BERNSTEIN
JOSEPH G. MILLER

BY Sughrue, Rothwell, Mion,
Zinn & Macpeak

ATTORNEYS

PATENTED JAN 30 1973

FIG. 11
QUALITATIVE THERMISTOR RESISTANCE VARIATION

COMBINATION FLUID FLOW SPEED AND DIRECTION TRANSDUCER

BACKGROUND OF THE INVENTION

1. Field of the Invention

This invention relates generally to the field of devices for indicating the azimuth of the earth's magnetic poles and also for indicating the speed and direction of this fluid flow, and, more particularly, to a transducer which simultaneously produces electric signals indicative of both the speed and/or magnetic azimuth of a fluid flow, such as wind.

2. SUMMARY OF THE INVENTION

The broad object of this invention is to provide an improved combination fluid flow speed and direction transducer.

In one preferred embodiment, this object is accomplished by mounting an anemometer housing on a wind vane which points in the direction of the wind. A magnetic switch is mounted to move with the wind vane. A magnetic flux concentrating rod is mounted in the arm of one of the anemometer wind cups and forms a part of a magnetic circuit. Positioned in the magnetic circuit is a magnetic field responsive electric device, such as a magnetodiode, which has an electrical characteristic which changes in response to the magnitude and polarity of the magnetic field to which it is exposed. The magnetic field responsive device is connected in an electric circuit which produces a signal proportional to both the magnitude and direction of the earth's magnetic field and also to the speed of rotation of the anemometer. Furthermore, the magnetic switch is activated to produce another electric signal each time a permanent magnet fixed to the rotating anemometer shaft passes the switch, thereby providing an indication of wind direction. The two signals are then applied to an indicator which indicates both the wind speed and the wind direction or azimuth relative to magnetic north.

In other preferred embodiments of the invention, the wind vane and magnetic switch are replaced by either a pressure sensitive transistor or by a self-heating thermistor. In variations of these embodiments, when the azimuth of the earth's magnetic north pole is known, the magnetic circuit is not required, and other means are employed to produce the signal indicative of the direction of the magnetic north pole.

In still another embodiment, the anemometer and wind direction sensing means are eliminated and the flux concentrating rod is mounted on a moving object and driven by a motor to provide an electronic compass which indicates the direction in which the object is heading.

Hence, another object of the invention is to provide an improved compass.

These and other objects will become apparent from the following description and illustrations of preferred embodiments of the invention.

DESCRIPTION OF THE PREFERRED EMBODIMENTS

Figure 1:
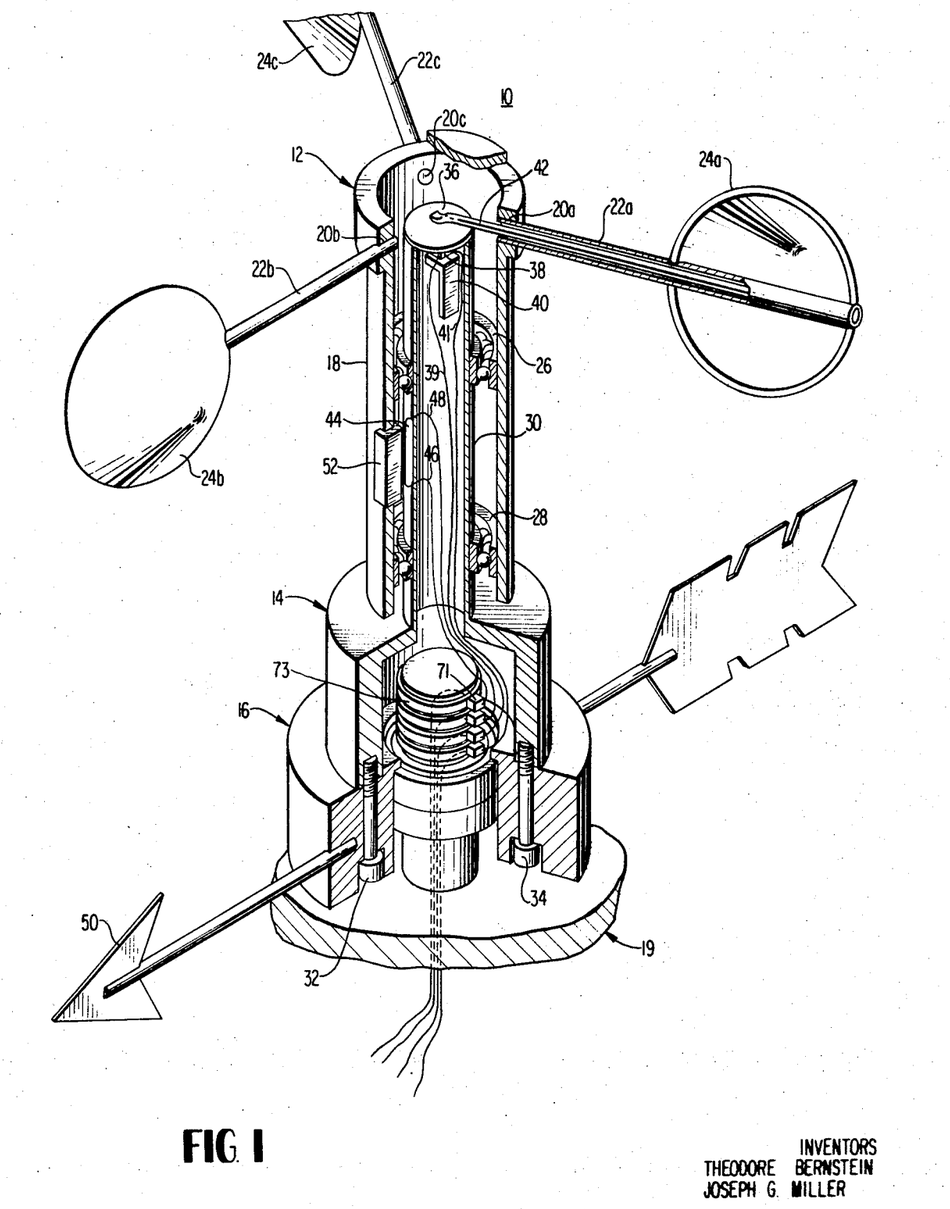
FIG. 1 is a sectional perspective view of one embodiment of the invention.

In the preferred embodiment illustrated in FIG. 1, the combination fluid flow speed and direction transducer is depicted as a wind speed and direction transducer 10. Transducer 10 basically comprises an anemometer 12 mounted on a base 14 which in turn is fixed to a wind vane assembly 16. The wind vane assembly 16 is rotatably mounted on a support 19 which in turn may be fixed, for example, to the cable of a weather balloon or the top of a buoy.

The anemometer 12 consists of a hollow cylindrical housing 18 having three holes 20a, b, c, for receiving and retaining three corresponding tubular wind cup arms 22a, b, c, to the opposite ends of which are fixed the anemometer wind cups 24a, b, c, respectively.

The anemometer housing 18 is rotatably supported by bearings 26 and 28 on the tubular member 30 of the base 14 of the transducer. Tubular member 30 extends upwardly within housing 18 and has a vertical axis which is co-axial with the axis of rotation of the anemometer housing 18. The base 14 is fixed to the wind vane assembly 16 by suitable means, such as bolts 32 and 34.

Fixed to the top of the tubular member 30 is a high permeability magnetic pole shoe 36. Fixed to the bottom of shoe 36 is a magnetoelectric transducer, such as a magnetodiode 38, and fixed to the lower surface of the magnetodiode is an L-shaped high permeability magnetic flux collector 40. Leads 39 and 41 are connected to the magnetodiode 40. The magnetoelectric transducer may also be a magneto-sensitive resistor, Hall effect device, etc. The hollow interior of tube 30 is filled with epoxy to bind the components in place.

Disposed in only one of the tubular arms 22, such as arm 22a, is a high permeability magnetic flux concentrating rod 42 which concentrates and steers the earth's magnetic flux, or field to which it is exposed through the magnetic circuit including the magnetic pole shoe 36, the magnetodiode 38 and the L-shaped flux collector 40. Additional rods of non-magnetic material, such as stainless steel, are placed in arms 22b and 22c to balance the anemometer. There is an air gap between the top surface of shoe 36 and the inner end of rod 42.

Also fixed to the tubular portion 30 of the base 14 is a magnetic reed switch 44 having a pair of electrical leads 46 and 48. Reed switch 44 is positioned over the wind vane 50 of the wind vane assembly 16, i.e. is positioned in the plane defined by the longitudinal axis of the vane 50 and the axis rotation of the anemometer 12. Since base 14 is fixed to the wind vane assembly 16, the angular position of reed switch 44 is always identical to that of the arrowhead of wind vane 50 which points in the direction from which the wind is blowing.

Fixed to the anemometer housing 18 at the same height as reed switch 44 is a permanent magnet 52, which functions to activate the reed switch 44 when it is opposite the switch. Since the anemometer 18 rotates relative to the base 14 in accordance with the speed of the wind to which the anemometer cups are exposed, permanent magnet 52 passes over reed switch 44 once each revolution of the anemometer, thereby activating the reed switch once each revolution.

Even though a reed switch and permanent magnet are disclosed in this preferred embodiment, it is to be understood that other proximity switching means, such as a photocell and light source, magnetic flux dependent resistor and magnet, mechanical switch and actuator, etc. may be used.

The operation of the transducer illustrated in FIG. 1 will be described in reference to that figure and also by reference to the schematic circuit diagram illustrated in FIG. 2 and the signal wave forms illustrated in FIG. 3.

Figure 2:
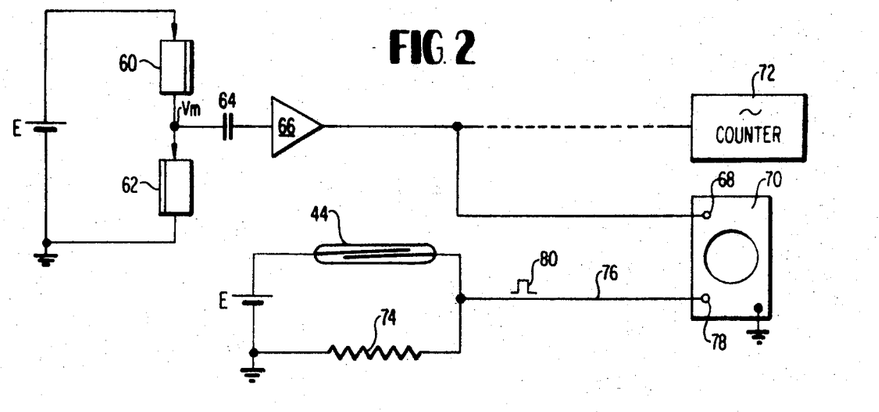
FIG. 2 is a schematic diagram of an electric circuit which may be used in conjunction with the transducer illustrated in FIG. 1.

The magnetic field sensitive magnetodiode 38 illustrating FIG. 1 actually comprises a pair of magnetodiodes 60 and 62, mounted physically back to back and electrically connected in series as shown in FIG. 2. These magnetodiodes are manufactured by Sony Corporation of Tokyo, Japan. Basically, a magnetodiode is a magneto-sensitive semiconductor device which works on the principle of controlled lifetime of injected carriers by an external magnetic field. Even though a single magnetodiode may be used to sense the earth's magnetic field, the back-to-back arrangement shown in FIG. 2 is insensitive to temperature variations. When a constant battery voltage E is applied across the magnetodiodes 60 and 62 as illustrated, the center potential $V_m$ without any applied magnetic field is substantially E/2 at any temperature. In this arrangement, for a given magnetic field direction, the resistance of one of the magnetodiodes will increase while that of the other will decrease. The incremental change of $V_m$ with an applied magnetic field of 1kOe is typically 1.5 volts for an E of 9 volts. The wave form of $V_m$ is illustrated in FIG. 3a.

Figures 3, 4, 5:
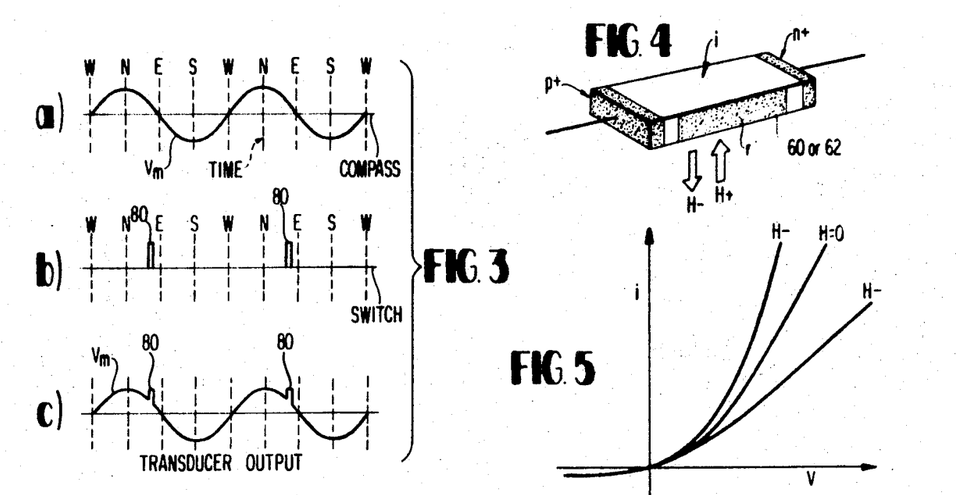
FIG. 3 illustrates the signal wave forms produced by the transducer of FIG. 1 and the circuit of FIG. 2.
FIG. 4 is a schematic diagram of the structure of a magnetodiode.
FIG. 5 is a graph illustrating the current-voltage characteristic of a magnetodiode for different magnetic fields.

The structure of a magnetodiode is schematically illustrated in FIG. 4. There, a magnetodiode 60 or 62 is shown to be a PIN semiconductor device wherein the region $i$ is a rectangular strip-shaped body of substantially intrinsic semiconductor in which the carrier concentration is low and can be efficiently modulated by injection. The regions $p+$ and $n+$ contain high concentrations of acceptors and donors, respectively, to facilitate efficient double injection of holes and electrons into the $i$-region. The distance between the $p+$ and $n+$ regions is made several times larger than the ambipolar diffusion length. The zone $r$ is formed locally either by mechanical means at the surface or by diffusion of certain impurities into the bulk of the $i$-region, so that the recombination of non-equilibrium electrons and holes takes place much more rapidly here than in the remainder of the $i$-region.

FIG. 5 is a graph illustrating the current-voltage characteristic of a magnetodiode for a magnetic field $H$ 0, and for the magnetic field H+ and the magnetic field H− having the relative polarities as indicated by the corresponding arrows in FIG. 4.

In operation, the wind cups 24a, b, and c of the anemometer 12 are positioned such that the anemometer always rotates in a given direction, for example, clockwise when viewed from the top. For this direction of rotation then, the flux concentrating rod 42 directs through the magnetic circuit, including the rod 42, pole shoe 36, magnetodiodes 38, and flux collector 40, a magnetic field whose magnitude varies sinusoidally in time, with each cycle of the sinusoid corresponding to 1 complete revolution of the anemometer. The voltage $V_m$ follows the magnetic field variation to produce the wave form $V_m$ illustrated in FIG. 3a. This voltage is applied through a DC blocking capacitor 64 and an amplifier 66 to one input terminal of an indicator, which is illustrated in this example as a two-channel oscilloscope 70. The display of the sinusoidal wave form $V_m$ is illustrated in FIG. 3a.

The back-to-back magnetodiodes 60 and 62 are oriented such that, when the concentrating rod 42 is pointing towards the earth's magnetic north pole, the wave form $V_m$ is at its most positive level. In this case, the resistance of magnetodiode 60 is less than the resistance of magnetodiode 62. As the flux concentrating rod 42 rotates clockwise, $V_m$ decreases till it reaches 0 for the Due East direction E. Similarly, when the rod is pointing Due South S, $V_m$ is at its most negative level. The speed of rotation of the anemometer and thereby the wind speed can be calculated by properly calibrating the face of the oscilloscope in revolutions per second or units of wind speed. Alternatively, a cycle counter 72 calibrated in wind speed can be connected to the output of amplifier 66.

As the anemometer rotates at a speed proportional to the wind speed, the permanent magnet 52 passes over the reed switch 44 once each revolution. As shown on FIG. 2, switch 44 is connected in series with a DC source E, and a current limiting resistor 74. Each time the switch 44 is closed by the rotating magnet 52, the circuit is closed between resistor 74 and source E to provide a voltage pulse 80 on conductor 76 connected to the other input terminal 78 of the dual channel oscilloscope 70. The pulses 80 produced by the closures of switch 44 are illustrated in FIG. 3b. Since the wave forms of both $V_m$ and pulse 80 are presented simultaneously on the face of the scope, the position or phase of pulse 80 relative to the wave form $V_m$ is easily determined, and thereby the magnetic direction or azimuth of the wind is easily determined. It will be recalled that the magnetic reed switch 44 is fixed to the base 14 so that the angular position of the switch is identical to that of the arrowhead of the vane 50 which points into the wind. Consequently, the wave forms presented in FIGS. 3a and 3b indicate that the compass or magnetic direction of the wind is East-by-Northeast. By knowing the time base of the oscilloscope, the cycle length of this sinusoidal wave displayed in FIG. 3a represents the wind speed. Of course, as previously mentioned, the signal $V_m$ may be applied to separate cycle counter 72 calibrated directly in units of wind speed. It is of course obvious to one skilled in the art that the outputs of the magnetodiode and the reed switch may be electrically combined to provide a single trace on scope 70 of illustrated in FIG. 3c.

The leads of magnetodiodes 38 and of reed switch 44 are connected to brushes 71 fixed to base 14. The brushes ride on slip rings 73 which are fixed to support 19 and provide means for applying the signals to scope 70. Alternatively, a power supply and radio transmitter could be mounted on assembly 16 and connected to the leads of the magnetodiodes and reed switch, thereby eliminating the need for the brush and slip ring assembly.

Figure 6:
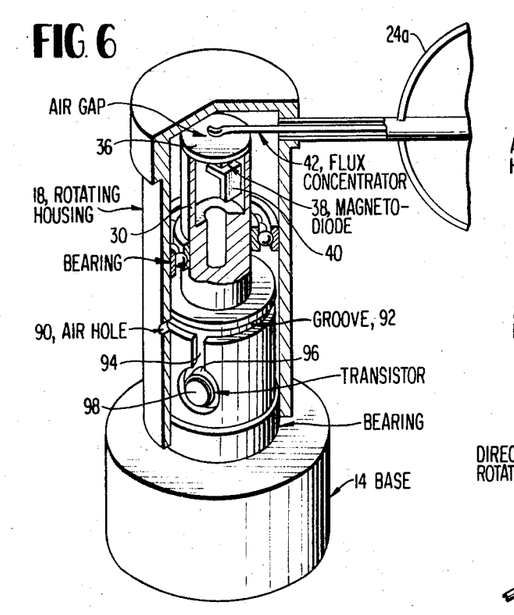
FIG. 6 is a sectional perspective view of another embodiment of the invention.

FIG. 6 illustrates an embodiment of the invention which does not require the wind vane assembly 16 of FIG. 1. Corresponding parts of FIGS. 1 and 6 carry the same reference numerals. In this embodiment a hole 90 is bored in the rotating anemometer housing 18, and a circular groove 92 is cut in the tube portion 30 of the base 14 at the same height as the hole 90. A vertical groove 94 is also formed in tube 30 in communication with the circular groove 92. A pressure-sensitive electric transducer, such as a pressure-sensitive diaphragm-operated transistor 96, is mounted in the groove 94. The upper part of the transducer including the flux concentrating rod 42, the magnetic field responsive transducer 38, and magnetic circuit elements 36 and 40 are the same as in the FIG. 1 embodiment.

In operation, as the anemometer is rotated by the wind, the air hole 90 and housing 18 rotate about the groove 92 to permit wind to pass through the hole 90 into the grooves 92 and 94 and to the pressure sensitive transducer 96 which produces an electrical output corresponding to the wind pressure impinging upon the transducer. Consequently, once each revolution of the anemometer, the pressure transducer 96 will experience maximum wind pressure and produce a corresponding maximum signal.

Figure 7:
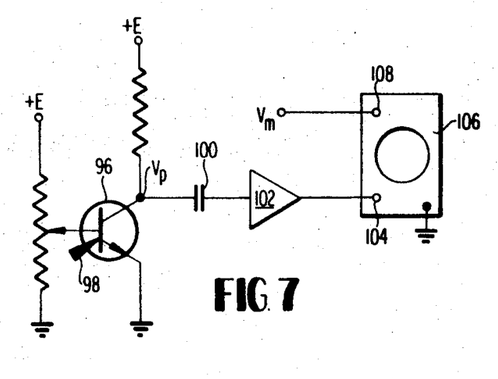
FIG. 7 is a schematic diagram of a circuit which may be used in conjunction with the embodiment of FIG. 6.

FIG. 7 is a schematic diagram of a circuit including the pressure sensitive transistor 96. Pressure sensitive transistor 96 has a pressure-responsive diaphragm 98, and the voltage $V_p$ is a sinusoidal signal whose phase depends upon the wind direction. For example when the hole 90 is facing into the wind, the maximum wind pressure is seen by the transistor 96 and produces maximum levels of voltage wave form $V_p$. As the anemometer continues to rotate, the pressure seen by the transistor reduces until it is at a minimum value when the hole 90 is 180° from the wind direction. The signal $V_p$ is applied through a DC blocking capacitor 100 and an amplifier 102 to one input terminal 104 of a two-channel oscilloscope 106. In like manner, the earth's magnetic field signal $V_m$ is applied to the other input terminal 108 of the oscilloscope.

Figure 8:
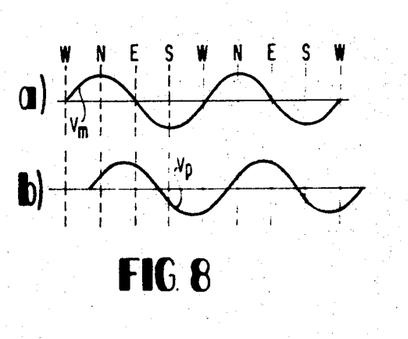
FIG. 8 is a graph illustrating signal wave forms produced by the transducer illustrated in FIG. 6.

FIG. 8 illustrates the wave forms $V_m$ and $V_p$ displayed on the oscilloscope. Once again, the maximum positive polarity of $V_m$ indicates the direction of the earth's magnetic north pole, and here the phase of $V_p$ relative to $V_m$ indicates the wind direction relative to magnetic north. In the case illustrated, the maximum voltage peaks of $V_p$ indicate that the wind direction is again East-by-Northeast.

Figure 9:
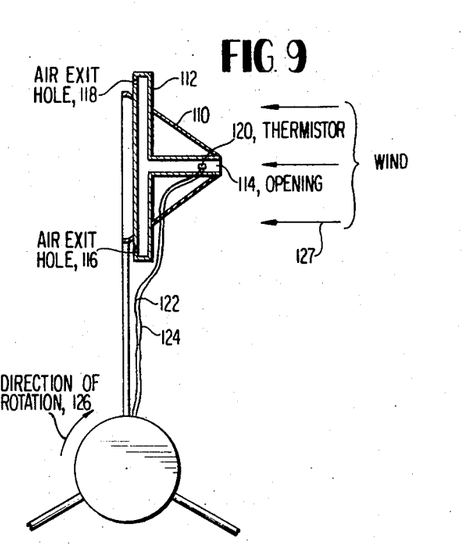
FIG. 9 is a schematic top view of another embodiment of the transducer of this invention.
Figures 10, 11:
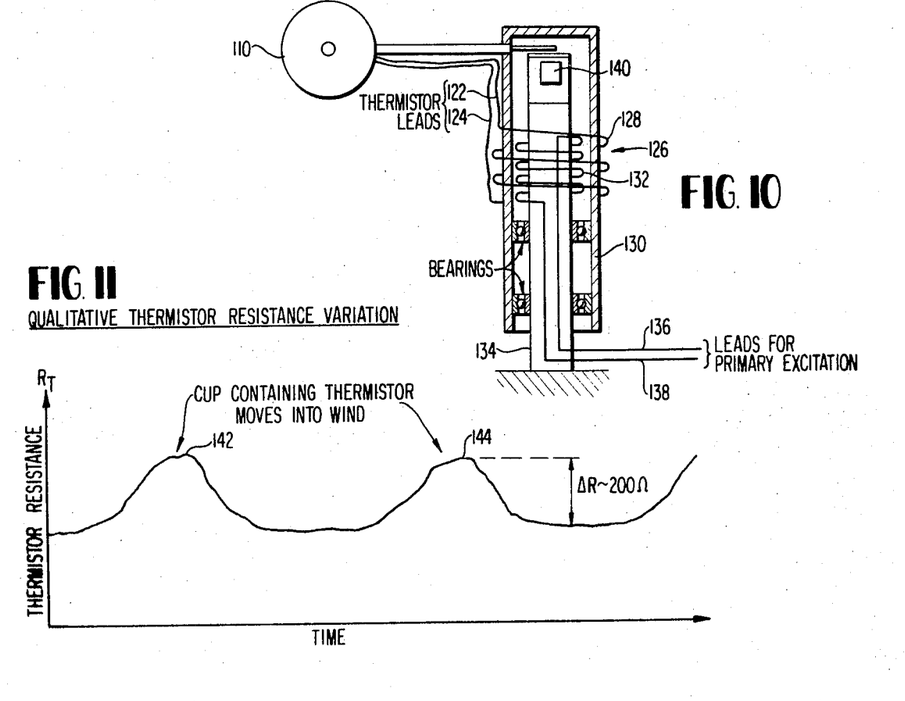
FIG. 10 is a front schematic view of the embodiment of FIG. 9.
FIG. 11 is a graph illustrating a signal waveform produced by the embodiment illustrated in FIGS. 9 and 10.
Figures 12, 13, 14:
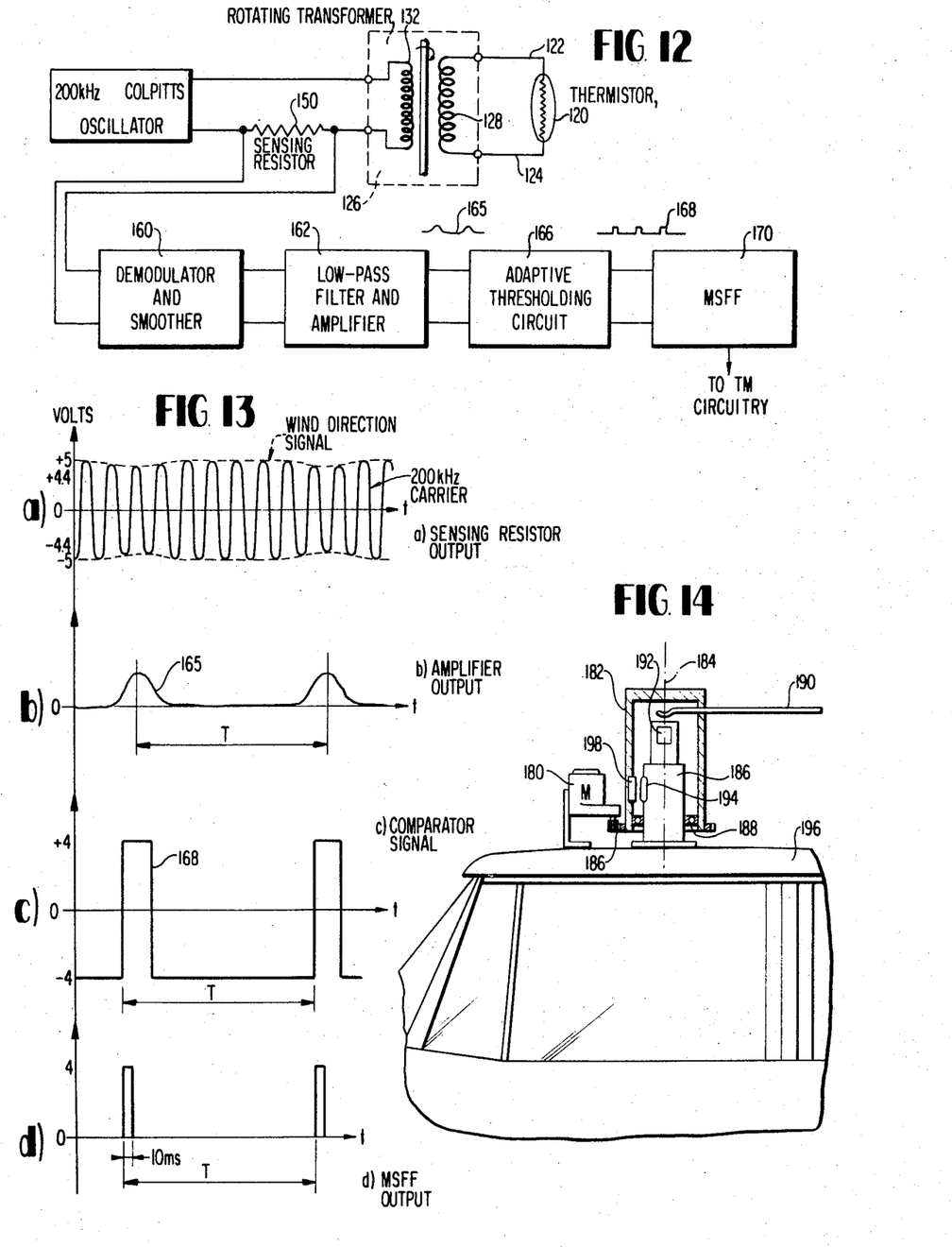
FIG. 12 is a schematic diagram of a circuit which may be used in conjunction with the transducer illustrated in FIGS. 9 and 10.
FIG. 13 is a graph illustrating various signal wave forms produced by the circuit of FIG. 12.
FIG. 14 is a schematic diagram of the electronic compass embodiment of the invention.

In the embodiment of the invention illustrated in FIGS. 9, 10 and 12, the pressure sensitive transistor 96 is replaced by a self-heating thermistor for sensing the wind direction.

In this embodiment, a self-heating thermistor is placed in a channel in the rear of one of the anemometer wind cups so that when the back of this wind cup is facing in the direction of the wind, the thermistor is cooled, thereby changing its resistance. The change of resistance is electrically detected to produce a signal which is an indication of the wind direction. The magnetic field direction detecting part of the transducer is the same as that illustrated in FIGS. 1 and 6. The thermistor-derived signal and the magnetodiode signal are then applied to an indicator, such as an oscilloscope, so that the speed and magnetic direction of the wind may be determined.

As shown in a schematic top view in FIG. 9, the anemometer cup 110 is modified to include a T-shaped tube 112 having an open end 114 at the back of the cup. Air holes 116 and 118 are formed in the T-shaped tube 112 at the front of the cup. A self-heating bead thermistor 120 is mounted in the T-shaped tube as illustrated. A pair of electrical leads 122 and 124 connect the thermistor to a rotating transformer which is illustrated in more detail in FIG. 10. Again, assuming the anemometer cups are rotating in a clockwise direction indicated by arrow 126, the thermistor experiences maximum cooling when the back of the cup 110 is facing directly into the wind indicated by arrows 127. At this time, the thermistor has its highest resistance, and this condition is detected as is being described in more detail in connection with FIGS. 10 - 13.

As shown in FIG. 10, the thermistor 120 is energized by means of a rotating transformer 126 including a secondary winding 128 electrically connected to the thermistor leads 122 and 124 and wound on the rotating anemometer housing 130. The transformer also includes a primary winding 132 which is fixed to the stationary base 134 of the transducer. Leads 136 and 138 are connected to a suitable AC source.

In operation, the AC power applied to the primary winding 132 induces a voltage in the secondary winding 128 to heat the thermistor 120 above the ambient temperature. When the rear of the anemometer cup 110 is facing directly into the wind, the resulting cooling of the thermistor produces an increase in the resistance of the thermistor, and this increase in the resistance of the secondary circuit of the transformer is reflected into the primary circuit and detected as a current pulse indicative of the wind direction. This current pulse is applied along with the voltage $V_m$ from the magnetodiode sensing circuit 140 to a suitable indicator, such as an oscilloscope, as illustrated in the previous embodiment.

FIG. 11 is a graph illustrating the thermistor resistance $R_T$ versus time as the anemometer rotates in the wind. The peaks 142 and 144 correspond to the points in time when the rear of the anemometer cup is facing directly into the wind. For the thermistor actually used, a difference of a resistance of $\Delta R = 200$ ohms was noted as the difference between the peak resistance and the minimum resistance of the thermistor.

FIG. 12 is a schematic block diagram of a thermistor energizing and wind direction sensing circuit which may be used in conjunction with the transducer of FIG. 10.

A 200 kHz Colpitts sine wave oscillator drives the primary winding 132 of the rotating transformer 126. The secondary winding 128 is attached mechanically to the rotating housing 130 of the anemometer and is connected electrically across leads 122 and 124 of thermistor 120. The cooling action of the thermistor is sensed by a sensing resistor 150 connected in the primary circuit. As the wind cools the thermistor and raises its resistance, the decrease in current in the secondary winding is reflected as a corresponding decrease in the current in the primary winding. Thus, the voltage across the sensing resistor 150 is a 200 kHz sine wave which is amplitude modulated by the wind direction signal as shown in FIG. 13a. The voltage across the sensing resistor 150 is then passed through a demodulator and smoother 160 and a low pass filter and amplifier 160 to extract the wind direction signal 165 illustrated in FIG. 13b. Wave form 160 is converted to pulses of constant amplitude and constant width by means of an adaptive thresholding circuit 166 which includes a peak holding circuit and a comparator. The output of circuit 166 is shown as wave form 168 in FIG. 13c. The pulse train 168 is applied to the input of a monostable flip-flop (MSFF) 170, which produces a train of pulses of 4 volt amplitude and 10 milliseconds duration. The output of MSFF 170 is shown in FIG. 13d and may be applied to an oscilloscope along with the voltage signal $V_m$ from the magnetodiode circuit 140 or else may be applied to other suitable telemetry circuitry.

In the embodiments of the invention described up to this point, it has been assumed that the direction of the magnetic north pole of the earth was unknown. This condition occurs when the transducer is mounted on a cable of a tethered balloon or on the top of a water buoy or on other applications when it is impossible to fix the position of the transducer relative to the earth's surface and thereby to the earth's magnetic pole. However, in many installations the base of the transducer may be stationary with respect to the earth, and therefore the direction of the magnetic north pole is known. In these types of installations, the embodiments illustrated in FIGS. 6 and 10 may be modified since it is not necessary to actually detect the direction of the earth's magnetic field. In such cases, the magnetic field sensitive device, such as the magnetodiode is not required, and only the wind direction sensing part of the transducer is needed.

Consequently, in the FIG. 6 embodiment for example, the flux concentrating rod 42, the pole shoe 36, the magnetodiode 38, and the flux concentrator 40 may be eliminated. For the permanent installation described, the base 14 is fixed relative to the earth. A magnetic reed switch is positioned on the fixed tubular portion 30 so that it faces the earth's magnetic north pole. A permanent magnet is then fixed to the rotating anemometer housing 18 so that it passes over and activates the reed switch once each revolution of the anemometer. Consequently, in order to determine the magnetic azimuth of the wind direction, it is only necessary to compare the phase of the maximum values of the output wave form from the pressure transducer 96 with the switching pulses produced at each closure of the magnetic switch.

In like manner, the embodiment of FIG. 10 may be modified for fixed installations by eliminating the magnetodiode and associated magnetic elements 140, and again fixing a reed switch to base 134 so that the switch always faces the magnetic north pole. Again, a permanent magnet is fixed to the rotating housing 130, so that a switch pulse is produced once each revolution of the anemometer corresponding to the azimuth of the magnetic north pole. The output of the thermistor is then compared with the switching pulses to determine the magnetic azimuth of the wind direction in the same manner as described for the fixed installation modification of the FIG. 6 embodiment employing the pressure sensitive transistor.

Another embodiment of the invention involves a variation of the embodiment illustrated in FIG. 1. In this figure, the magnetic circuit including the flux concentrating arm 42, the pole shoe 36, the magnetodiode 38, and the flux concentrator 40, in combination with the associated indicator, may be considered as an electronic compass since the signal $V_m$ represents the direction of the earth's magnetic field as the anemometer rotates through 360°. The positive peaks of this signal represent the magnetic north pole for clockwise rotation of the anemometer.

In the variation illustrated in FIG. 14, only the electronic compass portion of the embodiment of FIG. 1 is utilized, and the anemometer is replaced by an electric motor (M) 180 which rotates the housing 182 around a vertical axis 184 by means of a ring and pinion gear assembly 186 or other similar device. The housing 182 is rotatably mounted on the base member 186 by means of a suitable bearing 188. A horizontal magnetic rod 190 extends radially from the housing 182 and serves to concentrate the earth's magnetic field as already explained in connection with FIG. 1. The flux from rod 190 is directed to a magnetic circuit 192 consisting of a magnetodiode and associated magnetic elements as illustrated in FIG. 1. As the motor continuously rotates housing 182 and rod 190, the magnetic circuit 192 will generate the voltage $V_m$ as illustrated in FIG. 3a.

A magnetic reed switch 194 is fixed to base 186 and oriented so that is always faces the front of a vehicle 196 to which the base 186 is fixed. A permanent magnet 198 is mounted on the rotating housing 182 so that it passes over and activates the reed switch 194 once each revolution of housing 182 to produce switching pulses 80 as illustrated in FIG. 3b. Therefore, in this embodiment, the sinusoidal signal $V_m$ represents the direction of the earth's magnetic field, and the switching pulses 80 represent the direction in which vehicle 196 is heading. The only basic difference is that the base of the transducer is now fixed to a vehicle rather than to a wind vane. Consequently, the phase of the switching pulse 80 relative to the maximum value of the signal $V_m$ (for clockwise rotation of the flux rod 190), gives the magnetic heading or azimuth of the direction in which the front of the vehicle is pointed.

It is obvious that the transducer illustrated in FIG. 14 can be fixed to any vehicle, such as an automobile, tank, or boat, and that the heading of such a vehicle can be easily determined by comparing the phase of the magnetic reed switching pulses with the $V_m$ wave form.

This electronic compass has advantages over the standard magnetic needle compass which cannot follow quick changes in direction of the vehicle. With the present invention, if the vehicle is subject to sudden and frequent changes in direction, the speed of motor 180 is merely increased until the rotational speed of the flux rod 190 is high relative to the frequency of changes in direction.

While the invention has been particularly shown and described with reference to preferred embodiments thereof, it will be understood by those skilled in the art that changes in form and details may be made therein without departing from the spirit and scope of the invention as defined in the following claims:

1. A transducer for simultaneously providing signals indicative of the speed and magnetic azimuth of the flow of a fluid comprising:
   a. a housing, fixed to the earth's surface;
   b. fluid speed sensing means rotatably mounted on said housing in the path of said fluid and adapted to rotate in a predetermined direction at a speed proportional to the speed of the flowing fluid;
   c. magnetic flux concentrating means fixed to said speed sensing means for rotation in the earth's magnetic field;
   d. magneto-electric transducer means fixed to said housing and responsive to the magnetic flux in said flux concentrating means for producing a sinusoidal electric signal having a frequency proportional to the rotational speed of said speed sensing means and magnitude and polarity proportional to the magnitude and direction of the earth's magnetic flux in said flux concentrating means;
   e. fluid flow direction sensing means on said transducer for producing, during each revolution of said speed sensing means, a fluid flow direction signal each time a predetermined point on said speed sensing means has an angular position corresponding to the direction from which the fluid is flowing, whereby the phase of said direction signal relative to said sinusoidal signal indicates the magnetic azimuth of the direction of fluid flow, and the frequency of said sinusoidal signal indicates the speed of said fluid flow; and
   f. said fluid flow direction sensing means comprising a fluid pressure-sensitive electric transducer means for providing said direction signal.

2. A transducer as defined in claim 1 wherein
   a. said fluid pressure sensitive electric transducer means comprises a pressure-sensitive transistor fixed to said housing, and
   b. said speed sensing means has a hole therein at said predetermined point to permit fluid pressure to be applied to said transistor, whereby maximum fluid pressure on said transistor produces said direction signal.

3. A transducer for simultaneously providing signals indicative of the speed and magnetic azimuth of the flow of a fluid comprising:
   a. a housing, fixed to the earth's surface;
   b. fluid speed sensing means rotatably mounted on said housing in the path of said fluid and adapted to rotate in a predetermined direction at a speed proportional to the speed of the flowing fluid;
   c. magnetic flux concentrating means fixed to said speed sensing means for rotation in the earth's magnetic field;
   d. magneto-electric transducer means fixed to said housing and responsive to the magnetic flux in said flux concentrating means for producing a sinusoidal electric signal having a frequency proportional to the rotational speed of said speed sensing means and a magnitude and polarity proportional to the magnitude and direction of the earth's magnetic flux in said flux concentrating means;
   e. fluid flow direction sensing means on said transducer for producing, during each revolution of said speed sensing means, a fluid flow direction signal each time a predetermined point on said speed sensing means has an angular position corresponding to the direction from which the fluid is flowing, whereby the phase of said direction signal relative to said sinusoidal signal indicates the magnetic azimuth of the direction of fluid flow, and the frequency of said sinusoidal signal indicates the speed of said fluid flow, said fluid being wind;
   f. said speed sensing means comprising an anemometer having a plurality of wind cups each attached to said housing via a radial arm lying in a plane generally parallel to the earth's surface;
   g. said flux concentrating means comprising a magnetic flux concentrating rod mounted in one of said arms;
   h. said fluid flow direction sensing means comprising:
      1. a self-heated thermistor mounted on said anomometer, said thermistor having a maximum resistance when moving directly into the wind, due to the cooling effect of the wind; and
      2. means for heating the thermistor above ambient temperature and means for connecting said thermistor in a circuit for producing said direction signal corresponding to said maximum resistance of said thermistor.

4. A transducer for providing a signal indicative of a fluid flow speed and direction relative to the known azimuth of one of the earth's magnetic poles comprising;
   a. a housing, fixed to the earth's surface;
   b. fluid speed sensing means rotatably mounted on said housing in the path of said fluid and adapted to rotate in a predetermined direction at a speed proportional to the speed of the flowing fluid;
   c. switch means fixed to said housing at a point having first angular position corresponding to said known azimuth of said one of the earth's magnetic poles;
   d. switch activating means fixed to said speed sensing means for activating said switch means once each revolution of said speed sensing means to produce a first signal indicative of the azimuth of said one magnetic pole;
   e. fluid flow direction sensing means on said transducer for producing, during each revolution of said speed sensing means, a fluid flow direction signal each time said direction sensing means passes through second angular position corresponding to the direction from which said fluid is flowing, whereby the phase of said direction signal relative to said first signal indicates the magnetic azimuth of the direction of fluid flow, and the frequency of either of said signals indicates the speed of said fluid flow; and f. said fluid flow direction sensing means comprising a fluid pressure-sensitive electric transducer for producing said direction signal.

5. A transducer for providing a signal indicative of a fluid flow speed and direction relative to the known azimuth of one of the earth's magnetic poles comprising:

a. a housing, fixed to the earth's surface;

b. fluid speed sensing means rotatably mounted on said housing in the path of said fluid and adapted to rotate in a predetermined direction at a speed proportional to the speed of the flowing fluid;

c. switch means fixed to said housing at a point having first angular position corresponding to said known azimuth of said one of the earth's magnetic poles;

d. switch activating means fixed to said speed sensing means for activating said switch means once each revolution of said speed sensing means to produce a first signal indicative of the azimuth of said one magnetic pole;

e. fluid flow direction sensing means on said transducer for producing, during each revolution of said speed sensing means, a fluid flow direction signal each time said direction sensing means passes through second angular position corresponding to the direction from which said fluid is flowing, whereby the phase of said direction signal relative to said first signal indicates the magnetic azimuth of the direction of fluid flow, and the frequency of either of said signals indicates the speed of said fluid flow;

f. said fluid being wind, and said fluid flow direction sensing means comprising a self-heating thermistor mounted on said speed sensing means and exposed to said wind, whereby said thermistor has a maximum resistance when it is moving directly into the wind, and means for connecting said thermistor in a detecting circuit whereby said maximum resistance is detected to produce said direction signal.

6. A transducer for producing an electric signal indicative of the direction of one of the earth's magnetic poles comprising:

a. a base member;

b. a magnetic flux concentrating rod mounted for rotation relative to said base member and extending in a direction generally horizontal to the earth's surface, c. means for rotating said rod in a plane substantially parallel to the earth's surface;

d. magnetic field responsive transducer means fixed to said base and positioned to receive the component of the earth's magnetic flux passing through said rod to produce sinusoidal sinusiodal electric signal with a polarity and magnitude indicative of the direction and magnitude of the magnetic flux in said rod;

e. means for producing a reference electric signal each time said rod passes through a predetermined angular position in each revolution, whereby the phase of said sinusoidal signal relative to said reference signal is indicative of the direction of said magnetic pole relative to said reference point; and f. wherein said motor is an anemometer driven by the wind and said angular position corresponds to the wind direction, whereby the frequency of said electric signal is indicative of the speed of the wind driving said anemometer, and the phase of said reference signal relative to a maximum value of said sinusoidal signal is indicative of the magnetic azimuth of the wind direction.

* * * * *

Disclaimer 3,713,336.—*Theodore Bernstein* and *Joseph G. Miller*, Madison, Wis. COMBINATION FLUID FLOW SPEED AND DIRECTION TRANSDUCER. Patent dated Jan. 30, 1973. Disclaimer filed Mar. 7, 1975, by the inventors.

Hereby enter this disclaimer to claim 6 of said patent.

[*Official Gazette July 22, 1975.*]